Aug. 10, 1965 F. H. BRAY ETAL 3,200,203
AUTOMATIC IDENTIFICATION SYSTEM
Filed Dec. 1, 1961
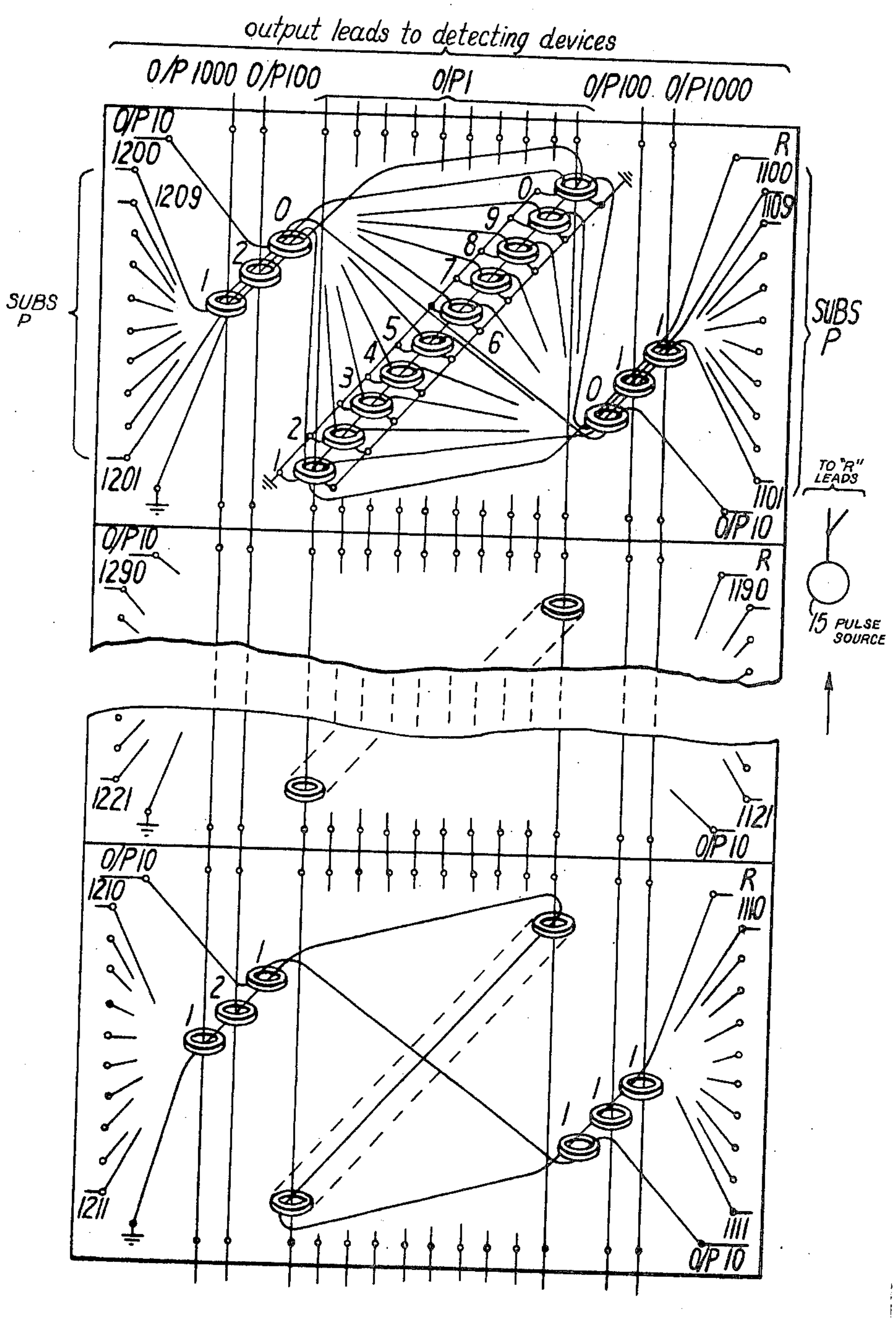
Inventors
F. H. BRAY
N. H. MARTIN
J. M. RIDLER
By [signature]
Attorney United States Patent Office 3,200,203
Patented Aug. 10, 1965

3,200,203

AUTOMATIC IDENTIFICATION SYSTEM

Frederick Harry Bray, Norman Hadlow Martin, and John Malcolm Ridler, all of London, England, assignors to International Standard Electric Corporation, New York, N.Y., a corporation of Delaware Filed Dec. 1, 1961, Ser. No. 156,335
Claims priority, application Great Britain, Dec. 12, 1960, 42,659/60
5 Claims. (Cl. 179—18)

This invention relates to automatic telecommunication exchanges, and in particular to equipment for automatic number identification of subscribers' line circuits in an exchange.

In automatic telecommunication systems it is generally necessary to be able to obtain automatically, at various stages in the progress of a call, information relating to one specific subscriber's line. This information may include, for example, (a) The identity, i.e., the directory number, of the line, (b) The class of service to which the line is entitled, (c) The cumulative total to date of the metering charges for calls made by the line.

This equipment must obviously be controlled by connections to the subscribers' line circuits concerned, and initiated by signals from some point or points in the path of a call from one of the lines. These signals are most conveniently transmitted back over the third wire of the switching network to the line circuit, from which a connection must be taken to the above common equipment without interfering with the normal holding and testing functions of the third wire.

Also, because of the large number of subscribers' lines in an exchange, the equipment should be designed to occupy as little space as possible and to be as inexpensive as possible, per line, consistent with efficient and reliable working.

Various methods are known for obtaining one or another of the types of information required. In these the third wires of subscribers' lines are usually interconnected by decoupling networks, constructed so as to avoid mutual interference between lines, to a number of detecting or storage devices capable of being energised by suitable signals on any third wire. If more than one type of information is to be obtainable by signals on the same third wire connections, the signals must of course be different for each type and the arrangemnet may become much more complex.

U.S. Patent No. 3,139,486 entitled "Automatic Exchange Systems" which issued on June 30, 1964, and is assigned to the assignee of this application describes a method of working and the circuits required for obtaining the information in both (b) and (c) above. The present invention uses similar basic principles and relates to equipment which may be used for line identification and which is economically mounted and combinable with other similar information equipment using the same third wire connections. According to this invention therefore, there is provided, in an automatic telecommunication exchange, equipment for determining automatically any one of a plurality of items of numerical information concerning individual subscribers' lines. The equipment comprises a plurality of information storage devices having connections via associated input terminals to an operating lead from each of a group of subscribers' lines, a plurality of cards of insulating material mounted one above the other on a rack for carrying the said information storage devices and associated terminals, and means, including a system for providing electrical pulses, to control the operation of the equipment.

An embodiment will now be described with reference to the accompanying drawing, which shows diagrammatically the storage equipment necessary for identifying by a sequence of digits the directory number of any line in a four-digit automatic exchange. No separate circuit diagram is shown, since the circuit connections are evident from the present drawing, except for the detection of the output of the storage devices, which may be performed by any of several known methods as indicated in the following description.

The drawing shows an assembly of vertically adjacent rectangles, of which each represents a card of insulating material. Then cards are shown assembled as a vertical column, but may alternatively be assembled as a stack of parallel planes, and mounted by any convenient known method on a rack. The drawing shows the top and bottom cards of the column and parts of the adjacent cards, the missing ones being entirely similar to the top card. On each card are mounted a number of banks of ring-shaped circular cores of ferro-magnetic material and associated terminals; these cores are conveniently shown at an angle to the line of sight in order to make plain the method of wiring, but it is not intended to show any particular method of mounting.

Each card carries two groups of input terminals ten terminals at the right-hand edge and ten at the left-hand edge, each terminal of these being connected by exchange cabling to the third wire of one subscribers' line circuit. Thus each card caters for 20 subscribers and the column of ten cards for 200 subscribers. The number of cards in a column may of course be greater or less than ten, if desired. The line numbering shown on the drawing is typical: 1100–1199 on the right and 1200–1299 on the left (each digit numbering in the order 1, 2 . . . 9, 0).

Each ferro-magnetic core is of the type having a substantially rectangular hysteresis loop, so that a definite minimum value of magnetising force is required to reverse the magnetisation in either direction, and the core will remain in one of two oppositely polarised remanent states when the magnetising current is cut off. The magnetising current is provided by threading current-carrying wires through the cores. A simple, basic, arrangement is that an operating lead connected to the third wire of each subscribers' line is threaded through four cores in series, one core corresponding to each of the four digits of a number, giving a total number of cores equal to four times the number of subscribers. Each core is also threaded by an output wire, and all cores are assumed to be normally in the state 0. When a line identity is required, an electrical identification pulse is applied to the third wire at a convenient point in the path to which the calling line has been connected, so that the four cores associated with the corresponding operating lead are switched to state 1, which causes a voltage pulse to appear in each corresponding output wire. Four groups of detecting devices are provided, each group corresponding to one digital position of any number and containing ten devices corresponding respectively to the ten possible values of a digit. Each output wire is then connected via an amplifier, and gates if necessary, to the detecting device which corresponds to the digital position and the digit value of the core associated with that output wire. Thus an identification pulse on any third wire will cause the operation of four detecting devices which will indicate the number of the associated subscribers' line. The detecting devices may be electro-magnetic relays or any other suitable devices with two stable states. It is obvious that only one line at a time in the exchange may be identified, and the exchange system has to be such that this requirement is met.

It is evident that better economy in cores might be obtainable by combining several output leads in one core.

The embodiment here described shows such a method, which reduces the number of cores to 0.8 per line instead of 4 as in the basic arrangement, while at the same time retaining simplicity and flexibility in the cabling and mounting.

Referring again to the drawing, the operating leads from all ten subscribers at the right of the top card, whose numbers differ only in the units digit, are threaded through a set of three cores which correspond to the thousands, hundreds, and tens digits respectively. Each of these leads then continues through the appropriate one of the centre set of 10 cores, which correspond to the units digit, to earth. Similarly the ten operating leads at the left, whose numbers differ only in the units digit but have a different hundreds digit from those at the right, are threaded through another set of three cores corresponding to the thousands, hundreds, and tens cores respectively. And each of these ten continues through the appropriate one of the 10 units cores, to earth. On the drawing each core is shown designated by the value of the digit which it indicates and which corresponds to the digit values in the numbers of the lines as shown at the input terminals.

Thus each units core is common to two operating leads, and each of the others to ten operating leads, giving 16 cores for each group of 20 lines, or 0.8 cores per line.

For each digit value in each digital position there will be a plurality of cores, through all of which in principle one output lead may be threaded for connection to one detecting device. On the drawing the output leads are designated O/P 1000, O/P 100, O/P 10, and O/P 1, according to the digital position coresponding to the core. It will be seen that it is possible and correct to thread one output lead (via the terminals shown) through all the corresponding cores in a column by straight vertical commoning, except for the tens digit which would require horizontal commons between the corresponding cards of different columns. For this reason the cores are positioned in the diagonal formation shown so that straight vertical commoning is obtained and the cores can be mounted in a minimum of space without mutual interference. It will be appreciated however, that with some other arrangement of cards (e.g., one above another in parallel planes) the cores might be differently positioned to achieve economy of space and still retain simplicity of wiring. In full four-digit exchange there would be 100 cores on the same output lead for each digit value of the thousands, hundreds, or tens digits, and 500 for each units digit value. In practice each common output lead could be a number of leads connected in parallel to the same detecting device, via decoupling gates, each lead threading a number of cores according to equipment and cabling convenience.

There is also an additional Read and Reset lead, designated R, which threads all the cores on each card and is grounded at one end and taken for all cards in parallel to a source of pulses 15 at the other end. This lead, and the tens output lead, are shown more clearly on the bottom card, where the other wiring has purposely been omitted. The source of pulses produces on the R lead a continuous train of pulses, controlled in synchronism with the identification pulse which is applied to the the third wire of a line circuit as mentioned before. This R pulse is of opposite sign to the identification pulse but of the same amplitude, and occurs just after it, so that the appropriate cores are switched by the identification pulse and the detecting devices operated, and then the cores are reset by the following R pulse, which of course has no effect on any unswitched cores.

The R lead has also another function if equipments for obtaining other types of information (e.g., metering information) are also connected to the same operating leads, using a similar ferro-magnetic core arrangement, e.g., as in our above-mentioned application. In this case the cores belonging to the other equipments may be inserted either before the identification equipment, or afterwards (by removing the earthed commoning on the units cores). It is then necessary to prevent operation of the identification equipment by operating pulses belonging to the other equipments. This is done by reducing the identification pulses to an amplitude which by itself will not switch any core, and providing a continuous train of precisely similar and synchronous pulses on the R lead, which will therefore also not switch any core; but simultaneous occurrence of an identification pulse and an R pulse will switch the cores.

In practice the identification pulse is generally made slightly wider than the R pulse, in order to allow for the loss in width due to longer rise times in the third wire circuits. Similar arrangements are made on the other equipments, with pulses of the same repetition frequency but occurring at different times. Then an operating pulse to any of the equipments using a common operating lead from the line circuit will switch cores only in that equipment in which an R pulse is simultaneously present, so that the equipments are effectively isolated from each other though using the same operating leads. The reset pulse occurs on the R lead as before to reset the switched cores, and also any cores partially energised by pulses from other equipments.

The embodiment described herein is concerned with identifying a subscribers' line. It is evident however, that the invention may be applied in principle to the extraction of any kind of information, relating to individual subscribers' lines, which is fixed for each line and is expressible in the form of a multi-element code.

It is to be understood that the foregoing description of specific examples of this invention is not to be considered as a limitation on its scope.

What we claim is:

1. An automatic line identification arrangement for identifying subscriber lines comprising a plurality of input terminals, said terminals divided into discrete groups, means for connecting said subscriber lines having common first digits and individual last digits to said terminals of the same discrete groups, memory means for storing multi-digit numbers to indicate a numerical designation corresponding to said line digits, said memory means comprising three banks of bi-stable devices for each two discrete groups, each of said bistable devices individually representing a digit of a decimal number, means for connecting each of the terminals of a first of said groups via all the devices in a first of said banks to a device individual to each of said terminals in a second of said banks, means for connecting each of the terminals of another of said groups via all the devices in a third of said banks to a device individual to each of said terminals of said another of said groups but common to said first group of terminals in said second of said banks, whereby said first bank stores the common first digits of said first group and said third bank stores the common first digits of said other group and said second bank stores the individual last digits of both said first group and said other group a plurality of output leads and means for serially connecting a separate one of said plurality of output leads through all of said bistable devices representing the same digit.

2. The arrangement of claim 1 wherein each of said bi-stable devices comprise a magnetic core element.

3. The arrangement of claim 1 wherein each of said bi-stable devices comprise saturable reactors, each of said first and third banks comprise saturable reactors for individually representing thousands, hundreds and tens digits of said numerical designation, and said second bank comprising saturable reactors to individually represent each of ten units digit.

4. A memory storage unit for storing identification indicating signals comprising a plurality of insulated cards, each of said cards having mounted thereon a plurality of input terminals, each of said terminals being identified by a unique coded combination made up of a series of integers in different digital positions, a single bank of ferro-magnetic storage elements representing all integers of one of said positions of said series, a plurality of individual ferro-magnetic elements, there being one of each of said individual elements for each position in said series excluding said one position, a plurality of output leads, means for connecting one of said plurality of output leads through each of said ferro-magnetic storage elements representing integers in the same digital position and means responsive to signals on any of said input terminals for energizing said elements in a coded combination which identifies the terminal where said signals appear.

5. In the memory storage unit of claim 4 wherein a source of control pulses is provided, means for serially connecting said source to each of said storage elements mounted on each one of said plurality of elements and means connected to all of said storage elements for controlling the energization of said elements responsive to said control pulses.

References Cited by the Examiner

UNITED STATES PATENTS

| | | | |
|---|---|---|---|
| 2,854,517 | 9/58 | Heetman | 179—18 |
| 2,900,624 | 8/59 | Stuart-Williams | 340—174 |
| 2,910,674 | 10/59 | Wittenberg | 179—7 |
| 2,955,166 | 10/60 | McCreary | 179—18 |
| 2,960,682 | 11/60 | French | 340—347 |
| 2,992,421 | 7/61 | Whitney | 340—347 |
| 3,032,747 | 5/62 | French | 179—18 |
| 3,046,351 | 7/62 | Bennett et al. | 179—18 |

FOREIGN PATENTS

| | | |
|---|---|---|
| 1,103,987 | 4/61 | Germany. |

ROBERT H. ROSE, *Primary Examiner.*

WALTER L. LYNDE, STEPHEN W. CAPELLI, *Examiners.*